H. COOPER.
TRANSMISSION GEARING.
APPLICATION FILED DEC. 31, 1910.
1,011,163.
Patented Dec. 12, 1911.
2 SHEETS—SHEET 1.
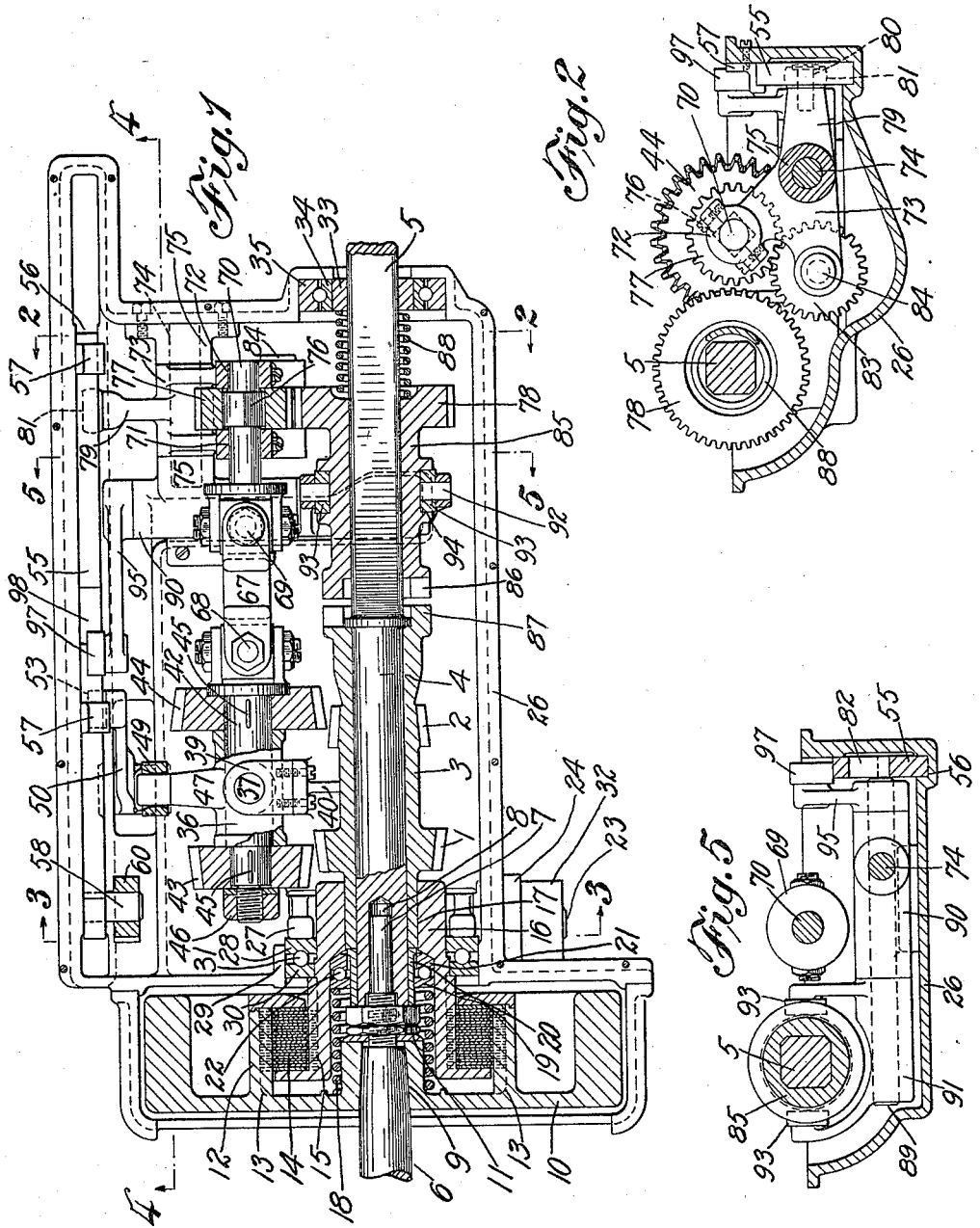
Attest
Frank H. Vick Jr.
Albert Thompson
Inventor
Herbert Cooper
by Sydney Prescott, Atty.

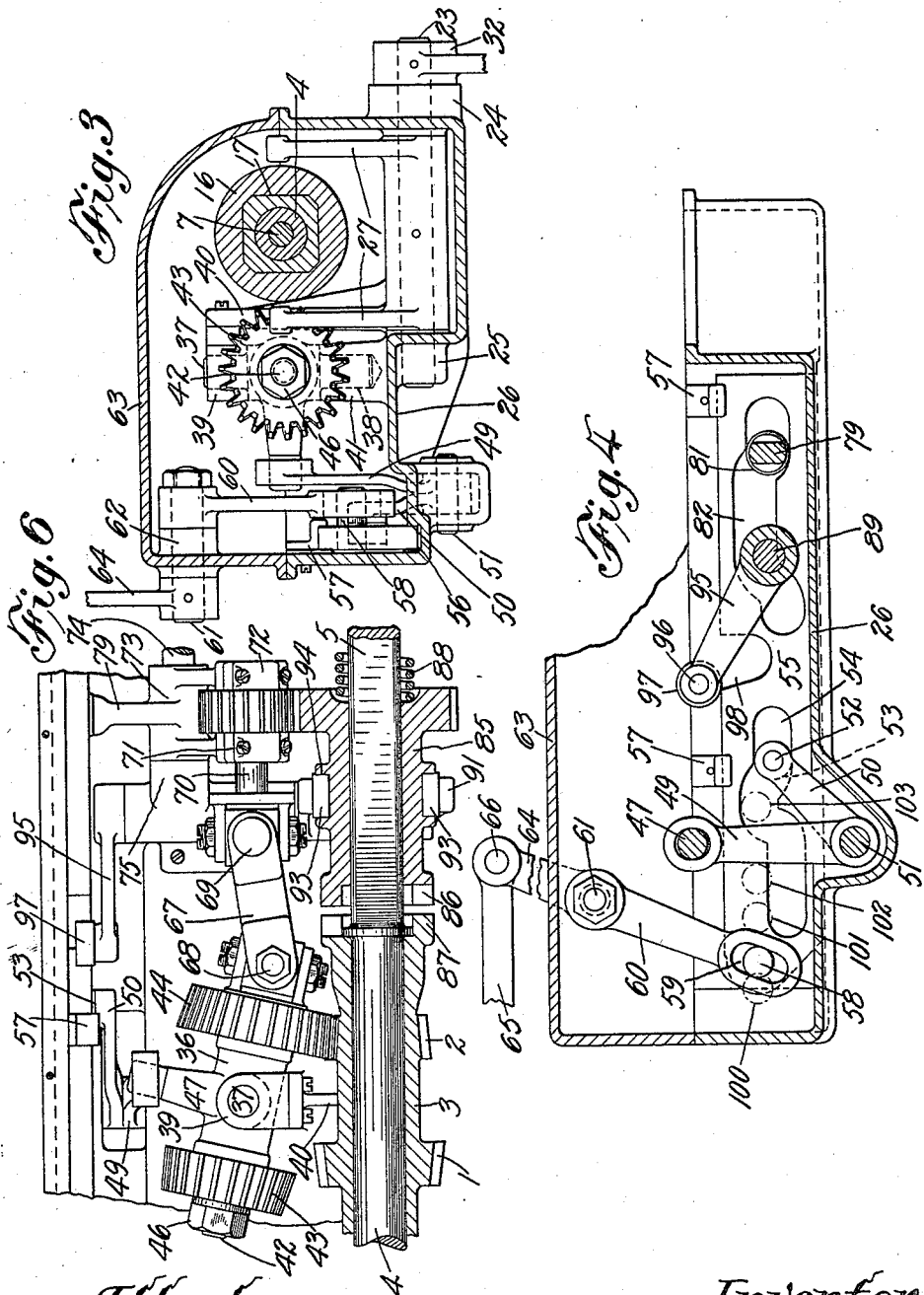

UNITED STATES PATENT OFFICE.

HERBERT COOPER, OF BROOKLYN, NEW YORK.

TRANSMISSION-GEARING.

1,011,163.  Specification of Letters Patent.  Patented Dec. 12, 1911.

Application filed December 31, 1910. Serial No. 600,347.

*To all whom it may concern:*

Be it known that I, HERBERT COOPER, a citizen of the United States, residing at Brooklyn, county of Kings, and State of New York, have invented a new and useful Improvement in Transmission-Gearing, of which the following is a specification.

This invention relates to an improvement in transmission gearing, particularly to that type employed in the driving mechanism of automobiles.

In the construction of transmission gearing heretofore used in connection with engines of the internal combustion type, it has been customary to employ change speed gearing arranged to provide three speeds forward and one or two speeds reversed.

Ordinarily, the gearing above referred to has been controlled by a system of connections including separate levers for different speeds and for the reversing mechanism. This complicates the equipment of the automobile, and renders the equipment defective for the reason among others that the wrong lever may be operated in an emergency, and accident result. Moreover, the initial cost and the cost of maintenance of the equipment are necessarily increased by the multiplication of controlling connections.

It is one of the objects of this invention, therefore, to provide a transmission gearing in which the movements of all the various change speed and reverse elements of the gearing are produced by a single controlling member, so that there can be no possibility of a driver operating the wrong lever.

A further object is the production of a device of the character described in which the movements of the several mechanisms constituting the transmission gearing are tied together, by connections operated by a single controlling member, in such a way that it is impossible to throw the high speed gears into action without first throwing all others out of action.

It is a further object to provide a device in which it is impossible to throw the reversing mechanism into action except under low speed.

It is another object to provide a device in which the transmission gearing may be instantly thrown out of action, independent of its position.

Still another object is to provide a device including a reciprocating controlling member carrying a plurality of cams each controlling the movement of one of the change speed and reverse mechanisms.

With these and other objects not specifically mentioned in view, the invention consists in certain constructions and combinations which will be hereinafter fully described and then specifically set forth in the claims hereunto appended.

In the accompanying drawings which form a part of this specification and in which like characters of reference indicate the same parts, Figure 1 is a general plan view, partly sectional, of a device constructed in accordance with the invention, Fig. 2 is a sectional view on the line 2—2 in Fig. 1, Fig. 3 is a sectional view on the line 3—3 in Fig. 1, Fig. 4 is a sectional view on the line 4—4 in Fig. 1, Fig. 5 is a sectional view on the line 5—5 in Fig. 1, and Fig. 6 is a fragmentary view showing the low and intermediate gears in a position different from that in which they are shown in Fig. 1.

In carrying the invention into effect, there is provided what may be termed a driver; that is to say, an element deriving motion from a source outside the transmission gearing and operating to drive the various motion transmitting elements of the transmission gearing, and this driver may vary within wide limits. There is also provided a shaft to be driven by the driver through the medium of the transmission gearing. This shaft may be a part of the transmission gearing organization, or in some constructions it may be located entirely beyond the limits of the transmission gearing but driven thereby. There is also provided a transmitting device between the driver and shaft, a reversing device between the driver and shaft, and a clutch device between the driver and shaft.

It is to be understood that wherever it is stated herein that any of the above devices are located between the driver and shaft, or any other part or mechanism is located between other parts or mechanisms, a position in the transmission train but not necessarily in a direct line from one part to another, is meant.

All of the above mentioned devices may vary within wide limits. There is also provided a single movable controlling member and connections between the controlling member and the various devices whereby the movement of each device is controlled by the movement of the controlling member.

The controlling member and the connections between it and the various devices may vary within wide limits. The best constructions will include a low and intermediate speed transmitting device, a low-speed reversing device, and a high-speed clutch device; and the connections between the controlling member and the several devices will be timed to throw the transmitting device into action only when the clutch device is out of action, to throw the clutch device into action only when both the transmitting and reversing devices are out of action, and to throw the reversing device into action only under low speed.

In the device selected to illustrate the invention, there is provided a driver including driving gearing consisting of a pair of gears 1 and 2 of different diameters. These gears are formed integrally on a sleeve 3 rotatably mounted on the cylindrical end 4 of a shaft, which shaft has also a substantially square end 5, and which is the shaft to be driven by the transmission gearing. The sleeve 3 derives its motion from a driving shaft 6 which may be the crank shaft of an engine not shown. The end of the shaft 6 is of reduced diameter at 7 and the reduced end rotatably engages the axial bore 8 in the free end of the cylindrical section of the shaft 4—5 for the purpose of retaining the two shafts in accurate alinement. The shaft 6 is tapered at 9, and upon the taper is secured a fly-wheel 10. A pair of lock nuts 11 aid to retain the fly-wheel in position in a well known manner. The fly-wheel 10 is provided with an annular flange 12 between the hub and rim, and this flange is channeled as indicated by dotted lines at 13 to receive lugs formed in one-half of a series of friction disks 14 located between the flange and hub of the wheel. The other half of the series of friction disks 14 have lugs engaging channels indicated by dotted lines at 15 and formed in the periphery of a slidable sleeve 16, which sleeve is provided with a substantially square bore adapted to fit the end of the sleeve 3 which is substantially squared to receive it at 17. A spring 18 is coiled around the hub of the fly-wheel 10 and bears against a ring 19 within the bore of the sleeve 16. The ring 19 is supported by a small sleeve 20 loosely mounted on the extreme end of the cylindrical section of the shaft 4—5. A second ring 21 is positioned within the bore of the sleeve 16 adjacent the ring 19. These two rings are provided with opposed ball races in which a series of balls 22 are located.

By an inspection of Fig. 1, it will be readily understood that the spring 18 normally acts to keep the friction disks in driving contact, and that the various parts just described constitute a friction clutch mechanism between the driving shaft 6 and the sleeve 3. The general construction of this friction clutch is well known, and since a more detailed description thereof is unnecessary to a full understanding of the present invention, it is omitted in the interest of brevity and clearness. The clutch mechanism just described is normally in action. Its particular function in the organization illustrated is to provide an emergency clutch which may be instantly operated to disconnect the driver from the driven shaft in the event of danger or accident. In order that this clutch may be thrown out of action whenever desired, there is provided a short shaft 23 mounted in bearings 24 and 25 formed in a casing 26, which is the main casing of the device. The shaft 23 carries a fork 27 the free ends of which bear against a ring 28 which is loosely mounted on the sleeve 16 and within a bearing 29 formed in the casing 26 concentric with the sleeve. A second ring 30 is fast on the sleeve 16 and runs within the bearing 29 adjacent the ring 28. The rings 28 and 30 are provided with opposed ball races in which a series of balls 31 are located. It will be readily understood that when the shaft 23 is rocked, the forks 27 will throw the sleeve 16 toward the fly-wheel 10 and release the friction disks from driving contact, thus releasing the emergency clutch. The shaft 23 is provided with an arm 32 by means of which it is rocked. It will be readily understood that the emergency clutch just described may be operated to release the driving shaft 6 from the sleeve 3 and consequently from the shaft 4—5 at any time and irrespective of the position of the parts lying in the transmission train between the sleeve 3 and shaft 4—5.

The square end 5 of the shaft 4—5 is provided with a block 33 upon which is fixed a ring 34. Concentric with the ring 34 is a second ring 35 fast in the end of the casing. These two rings are provided with opposed ball races in which is located a series of balls. The mechanism just described forms an anti-friction bearing the general construction of which is well known.

Adjacent the driving gearing formed by the gears 1 and 2 and the sleeve 3, is a bearing 36 provided with an upwardly projecting journal 37 and a downwardly projecting journal 38. The journal 37 is rotatably mounted in a bearing 39 which is screwed to a standard 40 rising from the casing 26. The journal 38 is rotatably mounted in a boss 41 rising from the casing 26. By this construction, the bearing 36 is pivotally mounted adjacent the driving gearing in such a manner that it may be swung in either direction through a horizontal plane which intersects the axis of the shaft 4—5. A short shaft 42 is journaled in the bearing 36, and upon one end of this shaft is secured a gear 43. The other end of the shaft 42 carries a gear 44. These gears are fastened to the shaft by means of keys 45 and a nut 46 in a well known manner, and are of different diameters. The gears 43 and 44 are normally out of mesh with the gears 1 and 2 of the driving gearing, as indicated in Fig. 1. Connections are provided for rocking the bearing 36 to throw one of the gears 43 and 44 into mesh with one of the gears 1 and 2 to impart different speeds to the shaft 42. For this purpose, the bearing 36 is provided with an arm 47 extending therefrom, and this arm engages, see Fig. 4, a slotted aperture in the end of an arm 49 which is one of the arms of a bell crank 49—50. This bell crank 49—50 is fulcrumed on a stud 51 secured in the casing 26. The arm 50 of the bell crank 49—50 carries a stud 52 upon which a bowl 53 is mounted. This bowl engages a cam slot 54 formed in a reciprocating plate 55. The plate 55 is arranged to slide in a groove 56 formed in the side of the casing 26 and in guide blocks 57 fast to the casing. By this construction, the movement of the bearing 36 is entirely dependent upon the movement of the plate 55 which thus constitutes a movable controlling member whereby either of the low or intermediate speed gears 44 and 43 may be thrown into mesh with the driving gears 2 or 1 and into action to transmit motion from the driving gearing to the shaft 42. For the purpose of moving the controlling member or plate 55, there is provided a stud 58 fast in one end of the plate 55 and arranged to engage a slot 59 in the lower end of an arm 60. This arm is fast on a short shaft 61 journaled in a bearing 62 formed in a cover 63, which cover is shaped to fit the casing 26 and inclose the transmission gearing therein. Upon the outer end of the shaft 61 is secured an arm 64, and motion is transmitted to the arm by means of a connecting rod 65 pivoted at 66 to the arm.

It is to be understood that the connecting rod 65 may be led to any convenient point on the vehicle in connection with which the device is used, and operated by a lever or other suitable device not shown. The mechanism including the rocking bearing 36, the shaft 42 and the gears 43 and 44, does not of itself transmit motion from the driver or driving gearing to the shaft 4—5, but it does transmit motion to connections which in turn transmit motion to the shaft. It therefore constitutes what may be termed a transmitting mechanism located in a transmitting train between the driving gearing and shaft. For the purpose of transmitting motion from this mechanism to the shaft 4—5, connections are provided between the mechanism and shaft whereby motion is transmitted from the driving gearing to the shaft.

These connections include a connecting shaft 67 provided with universal couplings 68 and 69 of well known construction. These couplings are assembled somewhat loosely so that the rocking movement of the bearing 36 will not bind the shaft 67 or its couplings. The coupling 69 is connected with a shaft 70 journaled in bearings 71 and 72. These bearings are carried by a frame 73 pivoted on a stud 74, which stud is fast in a boss 75 rising from the casing 26. The middle section of the shaft 70 is squared at 76, and upon this squared section is mounted a transmitting pinion 77. This pinion forms a member of what may be termed a gear train lying between the mechanism and shaft 4—5. A gear 78, having a square bore fitting the squared end 5 of the shaft 4—5, forms another member of this gear train. The pinion 77 and shaft gear 78 are normally out of mesh, as indicated in Figs. 1 and 2. Means are provided for throwing these gears into mesh, so that motion will be transmitted from the mechanism to the shaft. For this purpose, the frame 73 is provided with an arm 79 extending therefrom toward the plate 55 before referred to. This arm carries a stud 80 in its end, and upon this stud is mounted a bowl 81. The bowl 81 engages a cam slot 82 in the controlling plate 55, and it will be readily understood that the movement of the frame to throw the gear train in and out of mesh is entirely controlled by the movement of the plate 55.

For the purpose of reversing the direction of rotation of the shaft 4—5 under certain conditions, there is provided a reverse gear 83 which is loosely mounted on a pin 84 carried by the lower branch of the frame 73, Fig. 2. This reverse gear is always in mesh with the transmitting pinion 77 but is normally out of mesh with the shaft gear 78. By an inspection of Fig. 2, it will be readily understood that when the frame 73 is rocked in one direction the pinion 77 will be thrown into mesh with the shaft gear 78, and that when the frame is rocked in the opposite direction the reverse gear 83 will be thrown into mesh with the shaft gear 78. In the latter case, the direction of rotation of the shaft 4—5 will be reversed with respect to the direction of rotation of the driving shaft 6. By the construction so far described, motion is transmitted from the driving gearing of the sleeve 3 to the shaft 4—5 at either one of two speeds, depending upon the direction in which the bearing 36 is rocked. Further, this construction provides means whereby the direction of rotation of the shaft 4—5 is reversed. It may be here remarked that the reverse gear can be thrown into mesh with the shaft gear only when the low speed gear 44 is in mesh with the driving gear 2 of the driving gearing. This is due to the formation of the cams in the plate 55, and will be hereinafter further explained.

For the purpose of providing a third speed forward, a high-speed clutch device is provided. This device includes a slide 85 formed by an elongated hub of the shaft gear 78 before referred to. This slide carries, at the end opposite the gear 78, a clutch member 86 integral with the slide. This clutch member is adapted to coöperate with a similar clutch member 87 integral with the sleeve 3 of the driving gearing. Means are provided for moving the slide clutch member into mesh or engagement with the sleeve clutch member and consists in a spring 88 coiled around the shaft 4—5 and bearing against the block 33 and the end of the shaft gear 78. This spring is normally held in inoperative position, because when the low or intermediate speed gears are in mesh with the driving gearing the clutch must be out of mesh. For this purpose, there is provided a shaft 89 journaled in a bearing 90 rising from the casing 26. Upon one end of this shaft is fixed a fork 91 extending upwardly on either side of the slide 85 and carrying studs 92 upon which bowls 93 are mounted. These bowls engage an annular channel 94 cut in the slide 85. Upon the opposite end of the shaft 89 is fixed an arm 95 which carries at its free end a stud 96. This stud carries a bowl 97 which rides on the upper edge of the plate 55. A cam slot 98 is cut in the plate into which the bowl 97 will drop when the plate 55 is moved to the left, Fig. 4, thus releasing the spring 88 and permitting it to act to move the slide 85 toward the sleeve 3 to throw the clutch members into mesh or engagement.

Referring particularly to Fig. 4: The parts are shown in this figure in their normal position, corresponding to the normal position of the several devices as shown in Fig. 1. In this position, only the emergency clutch between the fly-wheel and sleeve 3 is in operative position, and the sleeve 3 is rotating idly on the cylindrical end 4 of the shaft 4—5. The dotted circles 100, 101, 102 and 103 represent different positions reached by the stud 58 during the reciprocation of the plate 55, which is effected by movements of the connecting rod 65. When the plate is moved to the left as indicated by the stud position 100, the bowl 97 will drop into the cam slot 98, thus releasing the spring 88 and permitting it to throw the high-speed clutch members into engagement. At this time, the bowls 53 of the transmitting mechanism and 81 of the gear train will ride idly in the cam slots 54 and 82 respectively. When the plate is returned to its normal position, the bowl 97 will ride up the side of the cam slot 98 to its normal position on the upper edge of the plate. It will be readily understood that it is impossible for the high-speed clutch device to be thrown into action, except when both the low and intermediate speed gears are out of mesh, because the cams carried by the controlling member or plate 55 are timed to prevent it.

When the plate is moved a step to the right of the normal position, as indicated by the stud position 101, the clutch controlling bowl 97 will ride idly on the top of the plate 55, thus preventing the spring 88 from throwing the clutch members into engagement. The bowl 53 will then be thrown to the highest position in the cam slot 54, which results in throwing the mechanism gear 43 into mesh with the driving gearing gear 1, on the intermediate speed. At the same time, the bowl 81 will be thrown to the highest position in the cam slot 82, which results in throwing the pinion 77 into mesh with the shaft gear 78, and thus completing the connections between the driving gearing and shaft 4—5 on the intermediate speed. When the plate 55 is moved farther in the same direction, as indicated by the stud position 102, the bowl 53 will be thrown back past the normal position to throw the low speed gear 44 into mesh with the driving gearing gear 2. During this time, the bowl 81 travels along the high part of the cam slot 82, retaining the pinion 77 and shaft gear 78 in mesh, thus holding the pinion and shaft gear in mesh but permitting the change of speed from intermediate to low. A further movement of the plate in the same direction, as indicated by the stud position 103, results in keeping the low speed gears 44 and 2 in mesh, but throws the frame 73 in the opposite direction, which results in throwing the pinion 77 out of mesh with the shaft gear 78 and throwing the reverse gear 83 into mesh with the shaft gear. It will thus be seen that the cams are so timed that the reverse gears can only be thrown into action on the low speed, and that neither the low nor the intermediate speed gears can be thrown into action when the high speed clutch members are in engagement. It will be readily understood also that the controlling member insures against any improper movement of any of the various mechanisms or devices for changing the speed or reversing, and constitutes a simple, efficient and durable organization well protected from derangement or injury.

In view of the foregoing, a detailed description of the operation of the device is deemed unnecessary and is therefore omitted.

Changes and variations may be made in the structure by means of which the invention is carried into effect. The invention, therefore, is not to be restricted to the precise details of the structure shown and described. Furthermore, certain parts of the structure shown and described, and certain parts of the invention, are capable of use independent of other parts, and such independent use is contemplated.

What is claimed is:

1. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft whereby motion is transmitted from the mechanism to the shaft, and means for rocking the bearing to throw one of the gears into mesh with the driving gearing.

2. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a connecting shaft having universal couplings whereby motion is transmitted from the mechanism to the shaft, and means for rocking the bearing to throw one of the gears into mesh with the driving gearing.

3. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a gear train and a connecting shaft having universal couplings whereby motion is transmitted from the mechanism to the shaft, and means for rocking the bearing to throw one of the gears into mesh with the driving gearing.

4. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a gear train and a connecting shaft having universal couplings whereby motion is transmitted from the mechanism to the shaft, and cam operated means for rocking the bearing to throw one of the gears into mesh with the driving gearing.

5. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a gear train and a connecting shaft having universal couplings whereby motion is transmitted from the mechanism to the shaft, an arm extending from the bearing, and a cam operated lever engaging the arm for rocking the bearing to throw one of the gears into mesh with the driving gearing.

6. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a gear train and a connecting shaft having universal couplings whereby motion is transmitted from the mechanism to the shaft, an arm extending from the bearing, a lever engaging the arm to rock the bearing in either direction to throw one of the gears into mesh with the driving gearing, and a reciprocating cam operating the lever.

7. In transmission gearing, the combination with driving gearing including a pair of gears of different diameters, of a shaft, mechanism including a bearing pivotally mounted adjacent the driving gearing, a short shaft journaled in the bearing and a pair of gears of different diameters fixed upon the short shaft and normally out of mesh with the driving gearing, connections between the mechanism and shaft including a gear train and a connecting shaft having universal couplings whereby motion is transmitted from the mechanism to the shaft, an arm extending from the bearing, a lever engaging the arm to rock the bearing in either direction to throw one of the mechanism gears into mesh with the driving gearing, and a reciprocating cam operating the lever.

8. In transmission gearing, the combination with driving gearing, of a shaft, mechanism including a bearing pivotally mounted adjacent the driving gearing, a short shaft journaled in the bearing and a pair of gears fixed upon the short shaft and normally out of mesh with the driving gearing, connections between the mechanism and shaft including a gear train and a connecting shaft having universal couplings whereby motion is transmitted from the mechanism to the shaft, an arm extending from the bearing, a lever engaging the arm to rock the bearing in either direction to throw one of the gears into mesh with the driving gearing, and a reciprocating cam operating the lever and shaped to throw the lever first in one direction and then in the opposite direction during one movement of the cam.

9. In transmission gearing, the combination with driving gearing, of a shaft, mechanism including gearing intermediate the driving gearing and shaft and normally out of mesh with the driving gearing and movable toward and away from and in a plane which includes the longitudinal axis of the shaft, connections between the mechanism and shaft including a gear train normally out of mesh, and a controlling device including means for moving the mechanism to throw its gearing into mesh with the driving gearing and means for throwing the gear train into mesh, whereby motion is transmitted from the mechanism to the shaft.

10. In transmission gearing, the combination with driving gearing, of a shaft, mechanism including gearing pivotally mounted intermediate the driving gearing and shaft and normally out of mesh with the driving gearing and movable toward and away from and in a plane which includes the longitudinal axis of the shaft, connections between the mechanism and shaft including a gear train normally out of mesh, and a controlling device including means for rocking the mechanism gearing to throw it into mesh with the driving gearing and means for throwing the gear train into mesh, whereby motion is transmitted from the mechanism to the shaft.

11. In transmission gearing, the combination with driving gearing, of a shaft, mechanism including gearing intermediate the driving gearing and shaft and normally out of mesh with the driving gearing and movable toward and away from and in a plane which includes the longitudinal axis of the shaft, a gear carried by the shaft, a movable frame, a transmitting pinion carried by the frame, connections between the mechanism and pinion whereby motion is transmitted from the mechanism to the pinion, and a controlling device including means for moving the mechanism gearing into mesh with the driving gearing and means for moving the frame to throw the pinion into mesh with the shaft gear.

12. In transmission gearing, the combination with driving gearing, of a shaft, mechanism including gearing intermediate the driving gearing and shaft and normally out of mesh with the driving gearing and movable toward and away from and in a plane which includes the longitudinal axis of the shaft, a gear carried by the shaft, a frame pivotally mounted adjacent the shaft gear, a transmitting pinion carried by the frame, connections between the mechanism and pinion whereby motion is transmitted from the mechanism to the pinion, and a controlling device including means for moving the mechanism gearing into mesh with the driving gearing and means for rocking the frame to throw the pinion into mesh with the shaft gear.

13. In transmission gearing, the combination with driving gearing, of a shaft, mechanism including gearing intermediate the driving gearing and shaft and normally out of mesh with the driving gearing and movable toward and away from and in a plane which includes the longitudinal axis of the shaft, a gear carried by the shaft, a frame pivotally mounted adjacent the shaft gear, a transmitting pinion carried by the frame, connections between the mechanism and pinion whereby motion is transmitted from the mechanism to the pinion, and a controlling device including means for moving the mechanism gearing into mesh with the driving gearing and cam operated means for rocking the frame to throw the pinion into mesh with the shaft gear.

14. In transmission gearing, the combination with driving gearing, of a shaft, mechanism including gearing intermediate the driving gearing and shaft and normally out of mesh with the driving gearing and movable toward and away from and in a plane which includes the longitudinal axis of the shaft, a gear carried by the shaft, a frame pivotally mounted adjacent the shaft gear, connections between the mechanism and pinion whereby motion is transmitted from the mechanism to the pinion, and a controlling device including means for moving the mechanism gearing into mesh with the driving gearing and including a reciprocating cam in engagement with the frame to rock the frame to throw the pinion into mesh with the shaft gear.

15. In transmission gearing, the combination with driving gearing, of a shaft, mechanism including gearing intermediate the driving gearing and shaft and normally out of mesh with the driving gearing, a gear carried by the shaft, a movable frame, a transmitting pinion carried by the frame, a reverse gear carried by the frame and in mesh with the pinion, connections whereby motion is transmitted from the mechanism to the pinion, and a controlling device including means for moving the mechanism gearing into mesh with the driving gearing and including means for moving the frame in one direction to throw the pinion into mesh with the shaft gear and to move the frame in the opposite direction to throw the reverse gear into mesh with the shaft gear.

16. In transmission gearing, the combination with driving gearing, of a shaft, mechanism including gearing intermediate the driving gearing and shaft and normally out of mesh with the driving gearing, a gear carried by the shaft, a frame pivotally mounted adjacent the shaft gear, a transmitting pinion carried by the frame, a reverse gear carried by the frame and in mesh with the pinion, connections between the mechanism and pinion whereby motion is transmitted from the mechanism to the pinion, and a controlling device including means for moving the mechanism gearing into mesh with the driving gearing and including means for rocking the frame in one direction to throw the pinion into mesh with the shaft gear and for rocking the frame in the opposite direction to throw the reverse gear into mesh with the shaft gear.

17. In transmission gearing, the combination with driving gearing, of a shaft, mechanism including gearing intermediate the driving gearing and shaft and normally out of mesh with the driving gearing, a gear carried by the shaft, a frame pivotally mounted adjacent the shaft gear, a transmitting pinion carried by the frame, a reverse gear carried by the frame and in mesh with the pinion, connections between the mechanism and pinion whereby motion is transmitted from the mechanism to the pinion, and a controlling device including means for moving the mechanism gearing into mesh with the driving gearing and including cam operated means rocking the frame in one direction to throw the pinion into mesh with the shaft gear and for rocking the frame in the opposite direction to throw the reverse gear into mesh with the shaft gear.

18. In transmission gearing, the combination with driving gearing, of a shaft, mechanism including gearing intermediate the driving gearing and shaft and normally out of mesh with the driving gearing, means for throwing the driving gearing and mechanism into mesh, a gear carried by the shaft, a frame pivotally mounted adjacent the shaft gear, a transmitting pinion carried by the frame, a reverse gear carried by the frame and in mesh with the pinion, connections between the mechanism and pinion whereby motion is transmitted from the mechanism to the pinion, an arm extending from the frame, and a reciprocating cam engaging the arm to rock it in one direction to throw the pinion into mesh with the shaft gear and to rock the frame in the opposite direction to throw the reverse gear into mesh with the shaft gear.

19. In transmission gearing, the combination with driving gearing, of a shaft, mechanism including gearing intermediate the driving gearing and shaft and normally out of mesh with the driving gearing, means for throwing the driving gearing and mechanism into mesh, a gear carried by the shaft, a frame pivotally mounted adjacent the shaft gear, a transmitting pinion carried by the frame, a reverse gear carried by the frame and in mesh with the pinion, connections between the mechanism and pinion whereby motion is transmitted from the mechanism to the pinion, an arm extending from the frame, and a reciprocating cam engaging the arm to rock it in one direction to throw the pinion into mesh with the shaft gear and to rock it in the opposite direction to throw the reverse gear into mesh with the shaft gear, said cam being shaped to throw the arm first in one direction and then in the opposite direction during one movement of the cam.

20. In transmission gearing, the combination with driving gearing, of a shaft, mechanism including gearing intermediate the driving gearing and shaft and normally out of mesh wtih the driving gearing, means for throwing the driving gearing and mechanism into mesh, a gear carried by the shaft, a frame pivotally mounted adjacent the shaft gear, a transmitting pinion carried by the frame, a reverse gear carried by the frame and in mesh with the pinion, connections between the mechanism and pinion whereby motion is transmitted from the mechanism to the pinion said connections including a connecting shaft having universal couplings, an arm extending from the frame, and a reciprocating cam engaging the arm to rock it in one direction to throw the pinion into mesh with the shaft gear and to rock it in the opposite direction to throw the reverse gear into mesh with the shaft gear.

21. In transmission gearing, the combination with driving gearing including low and intermediate speed gears, of a high speed clutch member carried by the driving gearing, a shaft, a coöperating high speed clutch member carried by the shaft, means normally held in inoperative position for producing a relative movement of the clutch members whereby they are thrown into engagement, mechanism including low and intermediate speed gears normally out of mesh with the low and intermediate speed gears of the driving gearing, connections between the mechanism and shaft including a gear train normally out of mesh whereby motion is transmitted from the mechanism to the shaft, a single movable controlling member, means in operative connection with the controlling member for throwing the low or intermediate speed gears into mesh, means in operative connection with the controlling member for throwing the gear train into mesh, and means in operative connection with the controlling member for releasing the clutch member moving means.

22. In transmission gearing, the combination with driving gearing including low and intermediate speed gears, of a high speed clutch member carried by the driving gearing, a shaft, a coöperating clutch member carried by the shaft, means normally held in inoperative position for moving the shaft clutch member into engagement with the gearing clutch member, mechanism including low and intermediate speed gears normally out of mesh with the low and intermediate speed gears of the driving gearing, connections between the mechanism and shaft including a gear train normally out of mesh whereby motion is transmitted from the mechanism to the shaft, a single movable controlling member, means in operative connection with the controlling member for throwing the low or intermediate speed gears into mesh, means in operative connection with the controlling member for throwing the gear train into mesh, and means in operative connection with the controlling member for releasing the clutch member moving means.

23. In transmission gearing, the combination with driving gearing including low and intermediate speed gears, of a high speed clutch member carried by the driving gearing, a shaft, a coöperating clutch member carried by the shaft, means normally held in inoperative position for moving the shaft clutch member into engagement with the gearing clutch member, mechanism including low and intermediate speed gears normally out of mesh with the low and intermediate speed gears of the driving gearing, connections between the mechanism and shaft including a gear train normally out of mesh whereby motion is transmitted from the mechanism to the shaft, and a single movable controlling member having a cam slot and coöperating connections for throwing the low or intermediate speed gears into mesh and having a cam slot and coöperating connections for throwing the gear train into mesh and having a cam slot and coöperating connections for releasing the clutch moving means.

24. In transmission gearing, the combination with driving gearing including low and intermediate speed gears, of a high speed clutch member carried by the driving gearing, a shaft, a coöperating clutch member carried by the shaft, means normally held in inoperative position for moving the shaft clutch member into engagement with the gearing clutch member, mechanism including low and intermediate speed gears normally out of mesh with the low and intermediate speed gears of the driving gearing, connections between the mechanism and shaft including a gear train normally out of mesh whereby motion is transmitted from the mechanism to the shaft, and a single movable controlling member having a cam slot and coöperating connections for throwing the low or intermediate speed gears into mesh and having a cam slot and coöperating connections for throwing the gear train into mesh and having a cam slot and coöperating connections for releasing the clutch moving means, the controlling member cam slots being arranged to hold the gearing out of mesh while the clutch members are in engagement and to throw the clutch members out of engagement before the gearing is thrown into mesh.

25. In transmission gearing, the combination with driving gearing including low and intermediate speed gears, of a high speed clutch member carried by the driving gearing, a shaft, a coöperating clutch member carried by the shaft, a spring normally held in inoperative position for moving the shaft clutch member into engagement with the gearing clutch member, mechanism including low and intermediate speed gears normally out of mesh with the low and intermediate speed gears of the driving gearing, connections between the mechanism and shaft including a gear train normally out of mesh whereby motion is transmitted from the mechanism to the shaft, and a single reciprocating controlling member having a cam slot and coöperating connections for throwing the low or intermediate speed gears into mesh and having a cam slot and coöperating connections for throwing the gear train into mesh and having a cam slot and coöperating connections for releasing the clutch moving spring, the controlling member cam slots being arranged to hold the gearing out of mesh while the clutch members are in engagement and to throw the clutch members out of engagement before the gearing is thrown into mesh.

26. In transmission gearing, the combination with a shaft having a cylindrical section and a substantially square section, of a sleeve rotatably mounted on the cylindrical section, means for rotating the sleeve, driving gearing carried by the sleeve, a gear carried by the square section, and mechanism between the driving gearing and gear whereby motion is transmitted from the driving gearing to the gear, said mechanism being movable toward and away from and in a plane which includes the longitudinal axis of the shaft.

27. In transmission gearing, the combination with a shaft having a cylindrical section and a substantially square section, of a sleeve rotatably mounted on the cylindrical section, driving gearing carried by the sleeve, a gear carried by the square section, mechanism between the driving gearing and gear including gearing normally out of mesh with the driving gearing and movable toward and away from and in a plane which includes the longitudinal axis of the shaft and including means for moving the gearing whereby motion is transmitted from the driving gearing to the gear, a driving shaft, and a friction clutch mechanism between the driving shaft and sleeve.

28. In transmission gearing, the combination with a shaft having a cylindrical section and a substantially square section, of a sleeve rotatably mounted on the cylindrical section, driving gearing carried by the sleeve, a gear carried by the square section, mechanism between the driving gearing and gear including gearing normally out of mesh with the driving gearing and movable toward and away from and in a plane which includes the longitudinal axis of the shaft and including means for moving the gearing whereby motion is transmitted from the driving gearing to the gear, a driving shaft in alinement with the axis of the sleeve, a friction clutch member carried by the driving shaft, a coöperating friction clutch member carried by the sleeve, and means for throwing the clutch members out of engagement.

29. In transmission gearing, the combination with a shaft having a cylindrical section and a substantially square section, of a sleeve rotatably mounted on the cylindrical section and having a squared end, driving gearing carried by the sleeve, a gear carried by the square section, mechanism between the driving gearing and gear including gearing normally out of mesh with the driving gearing and movable toward and away from and in a plane which includes the longitudinal axis of the shaft and including means for moving the gearing whereby motion is transmitted from the driving gearing to the gear, a driving shaft in alinement with the axis of the sleeve, a friction clutch member carried by the driving shaft, a coöperating friction clutch member carried by the squared end of the sleeve, and means including a fork bearing against the friction clutch member carried by the sleeve and operating connections for throwing the clutch members out of engagement.

30. In transmission gearing, the combination with a driver, of a shaft, a transmitting device between the driver and shaft and movable toward and away from the shaft, a reversing device between the driver and shaft, a clutch device between the driver and shaft, a single movable controlling member, and connections between the member and each device whereby the movement of each device is controlled by the movement of the member.

31. In transmission gearing, the combination with a driver, of a shaft, a two-speed transmitting device between the driver and shaft and movable toward and away from the shaft, a one-speed reversing device between the driver and shaft, a one speed clutch device between the driver and shaft, a single movable controlling member, and connections between the member and each device whereby the movement of each device is controlled by the movement of the member.

32. In transmission gearing, the combination with a driver, of a shaft, a low and intermediate speed transmitting device between the driver and shaft and movable toward and away from the shaft, a low-speed reversing device between the driver and shaft, a high-speed clutch device between the driver and shaft, a single movable controlling member, and connections between the member and each device whereby the movement of each device is controlled by the movement of the member.

33. In transmission gearing, the combination with a driver, of a shaft, a transmitting device between the driver and shaft and movable toward and away from the shaft, a reversing device between the driver and shaft, a clutch device between the driver and shaft, a single reciprocating controlling member, and connections between the member and each device whereby the movement of each device is controlled by the movement of the member.

34. In transmission gearing, the combination with a driver, of a shaft, a transmitting device between the driver and shaft, a reversing device between the driver and shaft, a clutch device between the driver and shaft, a slideway, a single controlling member reciprocating in the slideway, and connections between the member and each device whereby the movement of each device is controlled by the movement of the member.

35. In transmission gearing, the combination with a driver, of a shaft, a low and intermediate speed transmitting device between the driver and shaft, a reversing device between the driver and shaft, a clutch device between the driver and shaft, a single movable controlling member provided with three cams, and connections between the cams and devices whereby the movements of the devices are controlled by the movement of the cams, the cams being timed to throw the reversing device into action only when the low-speed transmitting device is in action.

In testimony whereof, I have signed my name to this specification in the presence of two subscribing witnesses.

HERBERT COOPER.

Witnesses:
FRANK H. VICK, Jr.,
ALBERT THOMPSON.

Copies of this patent may be obtained for five cents each, by addressing the "Commissioner of Patents, Washington, D. C."